April 18, 1961 P. F. CAMPBELL 2,980,169
COMBINED SEAT COVER AND LAP PROTECTOR
Filed Aug. 8, 1957 2 Sheets-Sheet 1

INVENTOR.
PAUL F. CAMPBELL
BY
ATTORNEYS

April 18, 1961    P. F. CAMPBELL    2,980,169
COMBINED SEAT COVER AND LAP PROTECTOR
Filed Aug. 8, 1957    2 Sheets-Sheet 2
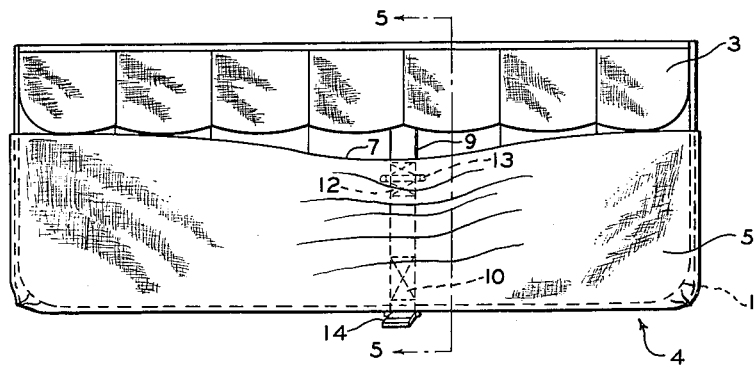
FIG. 3
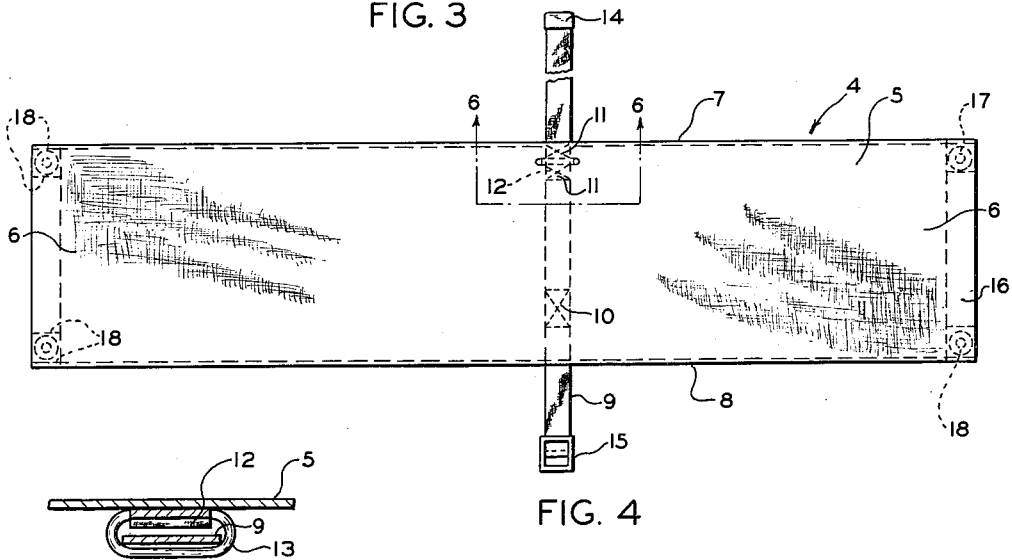
FIG. 4
FIG. 6
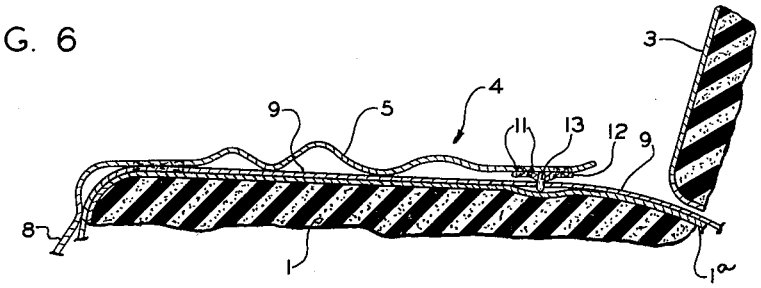
FIG. 5
INVENTOR.
PAUL F. CAMPBELL
BY
ATTORNEYS United States Patent Office 2,980,169
Patented Apr. 18, 1961

2,980,169
COMBINED SEAT COVER AND LAP PROTECTOR
Paul F. Campbell, Dunn Road, Rte. 2, Columbus, Ind.
Filed Aug. 8, 1957, Ser. No. 677,007
3 Claims. (Cl. 155—182)

This invention relates to combined seat cover and lap protector constructions and more particularly to apparatus adapted for installation on an automobile seat so as selectively to provide protection for the seat or, alternatively, both the seat and the occupants' clothing against hot cigarette or cigar ashes, spilled liquids and foods, and the like.

Persons who smoke and eat while driving and riding in automobiles not infrequently drop ashes from cigarettes, cigars and pipes, food particles, and beverages on themselves and on the seat upholstery with the result that the person's clothing and/or the upholstery becomes burned, stained, or otherwise marred.

An object of the invention is to provide a combined seat cover and lap protector adapted for installation on an automobile seat and selectively being capable of providing protection only for the seat or for both the seat and the occupants' clothing.

Another object of the invention is to provide a combined seat cover and lap protector which, when not in use to protect the occupants' clothing, lies flat upon the seat or may be folded to occupy the center portion of the seat leaving the ends of the seat upholsery exposed.

A further object of the invention is to provide a combined seat cover and lap protector which, in one of its positions, may lie on the seat and have its ends removably secured to a portion of the seat frame.

Still a further object of the invention is to provide a combined seat cover and lap protector which is easily and quickly mountable on or demountable from a seat.

Other objects and advantages of the invention will be pointed out specifically or will become apparent from the following description when it is considered in conjunction with the accompanying drawings, in which:

Figure 3 is a top plan view of the structure shown in Figure 2;

Figure 4 is a plan view of a seat cover and lap protector constructed in accordance with the invention and prior to its assembly with an automobile seat;

Figure 5 is a sectional view on the line 5—5 of Figure 3; and

Figure 6 is a sectional view on the line 6—6 of Figure 4.

Figure 1:
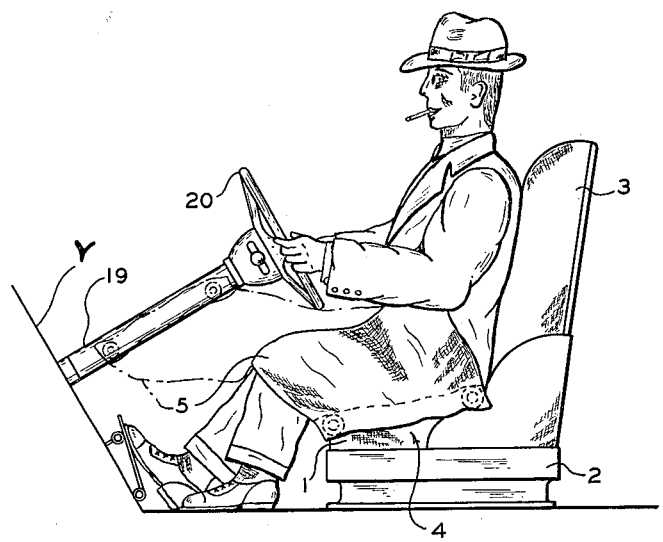
Figure 1 is a fragmentary view of an automobile and showing a combined seat cover and lap protector constructed in accordance with the invention in use to protect both the seat upholstery and the clothing of an occupant.

In Figure 1 of the drawings there is disclosed a portion of the front seat compartment of a vehicle V in which is located a vehicle seat 1 mounted on a metallic frame 2 and provided with a back 3 as is conventional. For purposes of illustration the seat shown is a front seat, but a cover formed in accordance with the invention is equally applicable to both the front and rear seats.

Figure 2:
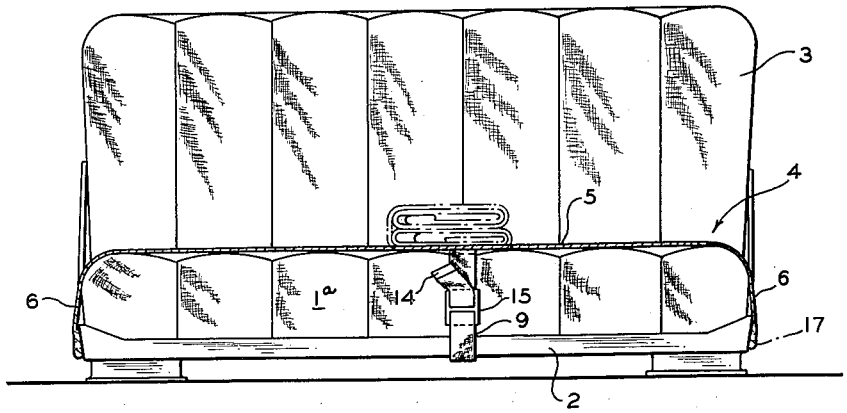
Figure 2 is a view partly in front elevation and partly in section of an automobile seat equipped with a combined cover and lap protector, the latter being arranged to protect the seat upholstery only.

A combined seat cover and lap protector constructed in accordance with the principles of the invention is represented in the drawings by the reference character 4 and comprises a strip 5 of flexible material having a length greater than the width of the seat so that the ends 6 of the strip overhang each side of the seat 1 as is shown in Figure 2. The width of the strip 5 preferably is greater than the depth of the seat 1 so that one side 7 of the strip may lie closely adjacent to the back portion 3 while the opposite side 8 of the strip may overhang the front end of the seat as is best shown in Figure 5.

At a position intermediate the ends of the strip 5 a flexible belt or strap 9 formed of woven cotton or the like is attached to the strip by means of stitching 10. Preferably the attachment of the belt 9 to the strip 5 is at a point substantially one-third the length of the strip and more closely adjacent to the edge of the side 8 than it is to the edge of the side 7 for a purpose which presently will be explained.

Adjacent to the rear edge 7 of the strip 5 there is secured by means of stitching or the like 11 a keeper member 12 formed of woven cotton or the like and which mounts a loop 13 formed of metal or any other suitable material, the loop 13 slidably receiving the belt 9 as is best shown in Figures 5 and 6. One end of the belt is provided with a metal cap or tip 14 to prevent unravelling of the belt material and the tip 14 is adapted to be threaded through loops of a buckle 15 fixed at the opposite end of the belt and so located as to be at the front of the seat 1 when the belt 9 encircles the latter for the purpose of mounting the cover 4 on the seat.

At each end of the strip 5 there is provided a hem 16 in which are located two or more wafer or disc type permanent magnets 17 of known construction. The magnets 17 may be retained in selected positions by rows of stitching 18.

When mounting the cover 4 on the front seat of the vehicle V the strip 5 is positioned so that its ends 6 overhang the edges of the seat substantially the same amount with the side of the strip to which the belt is secured located lowermost. Then the end 14 of the belt is inserted between the seat 1 and the back 3, as indicated in Figure 5, and thence brought around under the seat and engaged with the buckle 15 so as securely to mount the strip 4 on the seat 1. If it is desired to use the strip 5 purely as a seat cover, the magnets 17 can be placed in engagement with the metal frame 2 so as releasably to hold the ends 6 of the strip 5 in the positions shown in Figure 2 and thereby cover the seat upholstery material 1a. If, however, an occupant of the vehicle should desire to smoke a cigarette or the like, as is indicated in Figure 1, one of the ends 6 of the cover 4 may be disconnected from the seat frame 2 and draped over the lap of the occupant so as to protect not only the seat upholstery, but also the occupant's clothes from hot ashes or the like.

The draping of the strip 5 over an occupant of the vehicle is greatly facilitated by the ability of the rear side 7 of the strip to be moved forwardly relatively to the belt 9. The movement of the rear side of the strip is guided by the cooperation of the ring 13 and the belt 9 so as to prevent wadding and turning askew of the strip 5.

If two or more passengers occupy the seat 1 the driver may locate that position of the strip 5 on his side of the seat as he chooses, irrespective of what the position is of the remainder of the strip. Thus, the driver may sit upon the strip 5, or drape it over his lap, as is shown in Figure 1, or he may secure it to the metal steering column 19, which houses a steering wheel 20, by engaging the magnets 17 with the steering column. In the latter position, the driver's portion of the strip 5 will be held in readiness to protect his clothing and the upholstery from hot ashes when he decides to smoke another cigarette, but he need not support the strip on his lap between cigarettes. For reason of economy, the strip can of course, be made short to cover the driver's lap only.

Alternatively, the cover 4 can be so folded when it is not in use that it occupies substantially the central portion of the seat as is indicated in Figure 2 in chain lines. In this position of the strip 5, either end is in readiness to be draped over the laps of the occupants.

Since the material from which the cover is made should be fireproof as well as waterproof, the material may be made of coated fibre glass or asbestos, or it may be made of flame resistant duck or other suitable material. In any event, it should be made of pliable, easily folded material, and preferably dyed a color to match or harmonize with the color of the upholstery of the vehicle.

The disclosed embodiment is representative of a presently preferred form of the invention but is intended to be illustrative rather than definitive thereof. The invention is defined in the claims.

I claim:

1. A combined auto seat cover and lap protector comprising a strip of flexible material having a length and width greater than the width and depth, respectively, of an auto seat with which it is to be used; a flexible attaching belt secured to said strip solely intermediate the ends and the sides of the latter, said belt being of such length as to encircle said seat from front to back; and means on said belt for securing said strip to an auto seat, the arrangement being such that said strip, when secured to an auto seat, may cover the latter and be be sat upon or may have the portions on either side of said belt raised to cover the lap of a person seated on the auto seat.

2. The construction set forth in claim 1 including guide means secured to said strip adjacent to one side edge, said guide means slidably receiving said belt.

3. The construction set forth in claim 1 including means at the ends of said strip for removably securing the ends of said strip in any one of a number of adjusted positions.

References Cited in the file of this patent

UNITED STATES PATENTS

| | | |
|---|---|---|
| 1,289,305 | Thomas | Dec. 31, 1918 |
| 1,519,741 | Schickerling | Dec. 16, 1924 |
| 2,851,033 | Posey | Sept. 8, 1958 |

FOREIGN PATENTS

| | | |
|---|---|---|
| 437,196 | Great Britain | Oct. 21, 1935 |